United States Patent Office 3,471,457
Patented Oct. 7, 1969

3,471,457
COATING COMPOSITIONS FORMED FROM POLYMERS HAVING ADJACENT PENDENT ESTER GROUPS
Joseph A. Vasta, Woodbury, N.J., assignor to E. I. du Pont de Nemours and Company, Wilmington, Del., a corporation of Delaware
No Drawing. Original application Apr. 29, 1966, Ser. No. 546,209. Divided and this application Sept. 25, 1968, Ser. No. 762,626
Int. Cl. C08f *17/16, 29/50*
U.S. Cl. 260—78.5                    19 Claims

ABSTRACT OF THE DISCLOSURE

A coating composition particularly useful for finishing appliances that has the film-forming constituent a polymer of
(A) 95–50% by weight of ethylenically unsaturated monomers having 2–16 carbon atoms; and
(B) about 5 to 50% by weight of ethylenically unsaturated esterified monomers which form pendent adjacent ester groups along the polymer backbone.

CROSS-REFERENCE TO RELATED APPLICATIONS

This is a divisional application of Ser. No. 546,209, filed Apr. 29, 1966, now Patent No. 3,427,291.

BACKGROUND OF THE INVENTION

This invention relates to a novel coating composition of a vinyl addition polymer that has attached to the polymer backbone adjacent pendent ester groups, to a process for making this polymer used in the coating composition of this invention, and to novel thermosetting coating compositions.

There is a need for a coating composition for use as an appliance finish which has improved physical properties over the conventional materials used in appliance paints and finishes, such as increased adhesion to metal substrates, excellent hardness and improved scratch and stain resistance. Also, there is a need for a coating composition which can be blended in small amounts with conventional finishes and will greatly improve the properties of these finishes without substantially increasing the cost of these products.

The coating composition of this invention is especially suited for use in finishes for appliances, such as refrigerators, freezers, stoves, washing machines, dryers, and the like. The coating composition of this invention has excellent adhesion to metal substrates, good hardness and excellent scratch, mar and heat resistance and is resistant to grease, alkali detergents, chemical fumes and stains from foods, drugs and tobacco.

This invention is also concerned with a novel thermosetting coating composition which can be applied by conventional equipment and cured at conventional baking temperatures while retaining the advantageous properties of the polymers. Also, the novel coating composition is compatible with conventional coating compositions, such as alkyd resins/thermosetting nitrogen containing resins, acrylic resins, nitrocellulose compositions and the like. An addition of only small amounts of the novel coating composition of this invention to these conventional coating compositions greatly improves the adhesion, hardness, scratch resistance and chemical resistance of these conventional coatings without a substantial increase in cost.

SUMMARY OF THE INVENTION

The novel coating composition of this invention contains as the film-forming ingredient a novel polymer which is formed from ethylenically unsaturated monomers and usually includes ethylenically unsaturated carboxylic acid monomers. Ethylenically unsaturated monomer esters having adjacent pendent ester groups are blended with the backbone monomers and this blend is polymerized to form the novel polymer.

More specifically, the polymer used as the film-forming ingredient of the novel coating composition of this invention is formed by polymerizing (A) 95–50% by weight of ethylenically unsaturated monomers having 2–16 carbon atom monomers (being different from the esterified monomers below) with
(B) about 5 to 50% by weight of ethylenically unsaturated esterified monomers which form pendent adjacent ester groups along the polymer backbone.

These esterified monomers have one of the following structures:

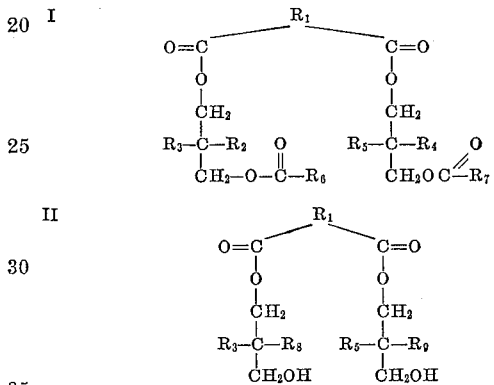

in which $R_1$ is a hydrocarbon group having 2–6 carbon atoms and at least one site of ethylenic unsaturation; $R_2$ and $R_4$ are each selected from the following group: —OH and —$CH_2OH$; $R_3$ and $R_5$ are each selected from the following group: —H, —$CH_3$ or —$C_2H_5$; $R_6$ and $R_7$ are each selected from the following group; saturated aliphatic hydrocarbon radical having 3–17 carbon atoms or an aromatic radical; $R_8$ and $R_9$ are each selected from the following group

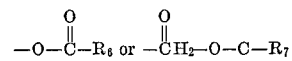

A mixture of esterified monomers having the above structures I and II can be used to form the novel polymer of this invention.

DESCRIPTION OF THE INVENTION

Preferably, the novel coating composition of this invention contains a polymer of about 20–40% by weight of the total weight of the polymer of the esterified monomer units and, more preferably, the polymer contains about 30% by weight of these esterified monomeric units.

In the one preferred polymer used in the coating composition of this invention, $R_1$ is —CH=CH— and $R_6$ and $R_7$ are saturated hydrocarbon radicals having 6–10 carbon atoms. In another preferred composition, $R_1$ is

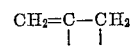

and $R_6$ and $R_7$ are phenyl radicals.

A wide variety of ethylenically unsaturated monomers, (A) above, can be used in forming the polymer used in the coating composition of this invention. However, at least 5% and up to 50% by weight of the polymer must be attributed to the aforementioned (B) esterified monomers so that the polymer will possess the abovementioned advantageous properties of hardness, scratch and heat resistance and the like.

Preferably, the (A) monomers are ethylenically unsaturated monomers having 2–16 carbon atoms per monomer unit. These monomers are readily available and polymerize by vinyl addition quite readily with the esterified monomers (B) to form the novel polymers used in the novel coating composition of this invention. For example, blends of the following monomers can be used with the aforementioned esterified monomers (B) to form the novel polymers used to form the novel coating composition of this invention; alkyl esters of acrylic and methacrylic acid in which the alkyl group contains from 1–12 carbon atoms; styrene; substituted styrene, such as vinyl toluene, acrylonitrile; vinyl chloride and the like. Typical examples of preferred monomers or blends of monomers are methyl methacrylate/ethyl acrylate, methyl methacrylate/acrylonitrile/methacrylic acid, acrylonitrile/methyl methacrylate, styrene/ethyl acrylate and styrene/methyl methacrylate.

Often it is desirable to have the polymer used to form the coating composition of this invention contain reactive carboxyl groups since polymers with an acid number up to 40 are quite useful. To accomplish this, a copolymerizable ethylenically unsaturated carboxylic acid is used as one of the (A) monomers, such as acrylic acid, methacrylic acid, crotonic acid, itaconic acid, maleic acid and the like.

Other preferred monomer (A) compositions are formed from monomers of an $\alpha,\beta$-unsaturated monovinylidene monocarboxylic acid, an ester of methacrylic acid of a $C_1$–$C_4$ saturated aliphatic monohydric alcohol and an aromatic hydrocarbon having 1 or 2 vinylidene groups per molecule; for example, methyl methacrylate/styrene/acrylic acid. Another preferred polymer composition is formed from an $\alpha,\beta$-unsaturated monovinylidene monocarboxylic acid, a methacrylic acid ester and an acrylic acid ester in which the esters are of a $C_1$–$C_8$ saturated monohydric alcohol, for example, methyl methacrylate/2-ethylhexyl acrylate/methacrylic acid. The above compositions are preferred since they form coatings that are hard, durable and scratch resistant.

The aformentioned esterified monomers (B) impart the polymer used in the novel coating composition of this invention with its excellent properties and are first formed by esterifying an ethylenically unsaturated dicarboxylic acid or an anhydride of the acid with a polyol and further esterifying this polyol ester with a saturated aliphatic monocarboxylic acid or an aromatic monocarboxylic acid. The resulting monomer ester units are then blended with the aforementioned (A) monomers and copolymerized to form the novel polymer used to form the coating composition of this invention.

An ethylenically unsaturated dicarboxylic acid, or an anhydride thereof, is used as the basis for the esterified monomers since these esterified monomers are readily polymerized into the polymer backbone through the ethylenic unsaturation of this constituent. The following are typical acids and anhydrides useful in this invention for forming the esterified monomer: maleic acid, maleic anhydride, fumaric acid, itaconic acid, itaconic anhydride, glutaconic acid, pyrocinchonic acid, zeronic acid, and the like. Preferred of this group are maleic anhydride, maleic acid, fumaric acid and itaconic acid since these are readily available and form coatings which have excellent adhesion hardness and scratch resistance.

Polyols, preferably triols, are used in the formation of the esterified monomers. Preferred polyols are glycerine, trimethylol ethane and trimethylol propane since these compounds are readily available and form products with excellent mar, scratch, stain and grease resistance.

The third necessary constituent for forming these esterified monomers is a saturated aliphatic monocarboxylic acid having 4–18 carbon atoms or an aromatic monocarboxylic acid. Typically useful saturated aliphatic acids are, for example, butyric acid, valeric acid, caproic acid, caprylic acid, pelargonic acid, capric acid, undecylic acid, lauric acid, palmitic acid, stearic acid and the like. The following aliphatic acids are preferred since they are relatively inexpensive and readily available: lauric acid and a mixture of $C_7$–$C_{11}$ saturated aliphatic acids comprising caprylic acid, enanthylic acid, pelargonic acid, capric acid and undecyclic acid.

Typically useful aromatic monocarboxylic acids which form the aromatic radical in the ester monomers of this invention are: benzoic acid, phenylacetic acid, toluic acid, $\beta$-phenylpropionic acid, mesitylic acid, ethylbenzoic acid, cuminic acid, trimethylbenzoic acid and the like. One preferred acid of this group is benzoic acid because it is readily available.

Polymers used to form the novel coating composition of this invention having the following compositions are particularly preferred because of their excellent physical properties:

(1) 30–50% by weight methyl methacrylate units/10–30% by weight styrene units/1–3% by weight acrylic acid units and 35–45% by weight of ester units which are the esterification product of 1 mole maleic acid or maleic anhydride, 2 moles of glycerine and 2 moles of a mixture of $C_7$–$C_{11}$ saturated aliphatic monocarboxylic acid;

(2) 10–30% by weight methyl methacrylate units/30–50% by weight units of 2-ethylhexyl acrylate/1–3% by weight of methacrylic acid units and 35–45% by weight of ester units which are the esterification product of fumaric acid/trimethylol ethane/lauric acid reacted in a molar ratio of 1:2:2;

(3) 30–50% by weight methyl methacrylate units/5–15% by weight acrylontrile units/0.5–2% by weight acrylic acid units and 40–60% by weight ester units which are the esterification product of itaconic acid/trimethylol propane/benzoic acid reacted in a molar ratio of 1:2:2.

The method for forming the novel polymer used to form the novel coating composition of this invention is to first form the esterified monomers and then blend these esterified monomers with the monomers for the polymer backbone followed by copolymerizing this blend to form the polymer.

The esterified monomers (B) are formed by reacting (a) an ethylenically unsaturated dicarboxylic acid or the anhydride of the acid with (b) a polyol and esterifying this polyol ester and (c) a $C_4$–$C_{18}$ saturated aliphatic monocarboxylic acid or an aromatic acid in a molar ratio of (a):(b):(c) of 1:2:2.

Preferably, in forming the esterified monomers the above ingredients (a), (b) and (c) are mixed with an inert solvent such as xylene, toluene and the like and the mixture is then refluxed at about 200–250° C. in a reaction vessel and water is removed until the desired acid number is obtained which is usually 3 or less. The low acid number indicates that the esterification reaction is complete.

The novel polymer that is used to form the novel coating composition of this invention is then formed by blending the above prepared esterification product with the (A) monomers in proportions selected to impart the desired physical properties to the product. This blend is dissolved in an inert solvent such as xylene, toluene, or methyl ethyl ketone and a polymerization catalyst is added in a concentration of 0.1—4% by weight of the nonomer. Typical catalysts are ditertiary butyl peroxide, cumene hydroperoxide, and azodiisobutyronitrile. The mixture is then refluxed at about 60–170° C., and more preferably, to about 120–140° C. until polymerization is complete. To determine when polymerization is complete, the polymer solids content or the viscosity of the mixture is measured. A constant viscosity of the mixture or a constant solids content indicates polymerization is complete.

The resulting polymer solution is suitable for direct use in the preparation of the novel coating composition of this invention. If the pure polymer is desired, it can be obtained by simply stripping the solvent from the solution, leaving behind a solid mass whose physical properties can range from resinous to crystalline, depending on the monomers and the preparation conditions used.

The novel coating composition of this invention can be prepared using the above polymers by blending them with such solvents as high solvency hydrocarbons, or with alcohols, esters, ketones or ethers, and, if desired, with pigments and such modifying agents as plasticizers and fillers. Preferably, the novel coating composition of this invention is pigmented and contains about 10–50% by volume pigment. The novel coating composition is formed by the customary procedures of sand-grinding or ball-milling the novel polymer, pigment and a solvent to form a mill base and blending the mill base with a solution of the novel polymer.

Novel thermosetting coating compositions especially suited for use as appliance enamels and the like can be made with the novel polymers by adding from 5 to 60% by weight of the film-forming polymers of a thermosetting coating resin which can be a condensate of formaldehyde with melamine, urea, or benzoguanamine or a melamine/toluene sulfonamide resin. The addition of the thermosetting resins imparts improved hardness and solvent, alkali and heat resistance to the resulting finishes. The aforementioned resins can be prepared according to directions in U.S. Patents 2,197,357; 2,508,875 and 2,191,957.

Another composition which forms a chemically inert coating can be made by using from 5 to 50% by weight of the film-forming polymers, of a phenol-formaldehyde resin with the novel polymers of the invention.

To novel coating compositions formed from polymers containing one of the above thermosetting resins, 5 to 30% by weight of the film-forming components of an epoxy polyether condensate having a plurality of vic-epoxy moieties can be added. These condensates preferably contain at least one aliphatic hydroxyl moiety per molecule. Addition of these epoxy resins to the coating compositions improves metal adhesion, flexibility and corrosion resistance. These epoxy resins can be prepared according to directions in U.S. Patents 2,503,726; 2,592,560 and 2,694,694.

Novel coating compositions of this invention can be applied by brushing, flow-coating, dipping, hand-spraying, electrostatic spray techniques and the like. After application, the coatings are cured by baking at 100° C. to 200° C. for from 1 to 120 minutes.

The examples which follow illustrate the invention. All quantities shown are on a weight basis unless otherwise indicated.

Example 1

The following ingredients are reacted to form a composition of monomeric esters (hereinafter referred to as Composition 1 Ester):

| | Parts by weight |
|---|---|
| Maleic anhydride | 98 |
| Glycerine | 184 |
| Emery's 3361 Special acid ($C_7$–$C_{11}$ saturated aliphatic monocarboxylic acid mixture containing 50% pelargonic acid ($C_9$)) | 370 |
| Xylol | 13 |
| Total | 665 |

The above ingredients are charged into a reaction vessel; the mixture is heated to the reflux temperature of the mixture; water is removed as the mixture is reacted and the reaction is continued until an acid number of less than 3 is reached.

Polymer A having an acrylic backbone is then formed by reacting Composition 1 Ester with the following ingredients:

| | Parts by weight |
|---|---|
| Portion 1—"Solvesso" 100 (aromatic naphtha solvent) | 30.44 |
| Portion 2: | |
| Styrene | 9.13 |
| Methyl methacrylate | 18.26 |
| Composition 1 Ester | 18.43 |
| Acrylic acid | 0.91 |
| Di-tertiary butyl peroxide | 0.46 |
| "Solvesso" 100 (aromatic naphtha solvent) | 5.37 |
| Total | 83.00 |

Portion 1 is charged into a reactor and is heated to its reflux temperature. Portion 2 is premixed and slowly added to the reaction over a 4-hour period while the mixture in the reactor is maintained at the reflux temperature. After Portion 2 has been added, the ingredients are maintained at the reflux temperature until a constant viscosity is reached.

The resulting Polymer A solution has a Gardner Holt viscosity of X to Z, a polymer solids content of 55% by weight and a weight of 8.30 pounds per gallon. Polymer A has the following composition:

| | Parts by weight |
|---|---|
| Methyl methacrylate units | 40 |
| Styrene units | 20 |
| Acrylic acid units | 2 |
| Composition 1 Ester units | 38 |
| Total | 100 |

An enamel paint is formulated by forming a mill base and then blending this mill base with the above prepared Polymer A solution and a melamine-formaldehyde resin.

| Mill Base A: | Parts by weight |
|---|---|
| Titanium dioxide (rutile) | 60 |
| Polymer A solution (55% polymer solids) | 20 |
| Xylol | 20 |
| Total | 100 |

The above ingredients are mixed together and ground to a 0.5 mil fineness using the conventional sand-grinding process.

An enamel paint is then prepared by blending the following ingredients together:

| | Parts by weight |
|---|---|
| Mill Base A | 166.67 |
| Polymer A solution | 75.77 |
| Melamine-formaldehyde resin solution (55% resin solids in butanol) | 54.54 |
| Xylol | 103.02 |
| Total | 400.00 |

This enamel paint has a pigment to binder ratio of 1/1, a solids content of 50% by weight and the weight ratio of Polymer A to melamine-formaldehyde resin is 70/30.

The enamel is reduced to a spray viscosity of 27 sec./ No. 2 Zahn cup with toluol. A coat of this enamel is sprayed onto unprimed and primed steel panels and the coated panel is baked for 30 minutes at 150° C. The baked enamel coat on both the primed and unprimed steel panels is about 1.5 mils thick and has a pencil hardness of 2H, i.e., a pencil or 2H hardness does not scratch or abrade the coating, and a Tukon hardness of 15–20 knoops. The Tukon hardness test is conducted according to ASTM D–1474 using a 25 gram load on a Tukon Tester. The coating also has excellent grease, heat and stain resistance. These properties of the enamel make the paint suitable for interior use on such appliances as stoves, refrigerators, washers and the like, or for exterior use on such items as air conditioners, cars and the like.

Example 2

The following paint Compositions I and III are prepared with Polymer A solution of Example 1 and compared for hardness and scratch resistance with the identical corresponding paint Composition II and IV that do not contain Polymer A of Example 1.

Alkyd paint Composition I:

| | Parts by weight |
|---|---|
| Mill Base A (prepared in Example 1) | 166.67 |
| Polymer A solution (55% polymer solids prepared in Example 1) | 39.40 |
| Coconut oil alkyd resin (60% polymer solids in xylol in which the alkyd polymer is 57.6% by weight glycerol phthalate/37.0% by weight coconut oil/5.4% by weight excess glycerine) | 50.00 |
| Melamine-formaldehyde resin (55% resin solids in butanol) | 54.54 |
| Total | 310.61 |

The above ingredients are blended together and the resulting paint has a solids content of about 64%, a pigment to binder ratio of 1/1 and a binder composition of coconut oil alkyd/Polymer A/melamine-formaldehyde resin of 30/40/30.

Alkyd paint Composition II.—The constituents of Composition I are used as above to prepare paint Composition II except that coconut oil alkyd resin is used in place of Polymer A in the mill base and in the paint formulation.

Both alkyd paint Compositions I and II are reduced to a spray viscosity of 27 sec./No. 2 Zahn cup with toluol and each of these paints is then sprayed on a separate primed steel substrate and baked for 30 minutes at 140° C. The resulting coatings are about 1.0 mil thick and appear to be well bonded to the steel substrate.

Nitrocellulose paint Composition III:

| | Parts by weight |
|---|---|
| Mill Base A | 166.67 |
| Polymer A solution (55% polymer solids prepared in Example 1) | 39.40 |
| Nitrocellulose solution (32% polymer solids in methyl ethyl ketone having a viscosity of ¼ to ½ sec., as measured according to ASTM Method D-301-50) | 93.75 |
| Urea-formaldehyde resin (60% resin solids in butanol) | 50.00 |
| Xylol | 50.18 |
| Total | 400.00 |

The above ingredients are blended together and the resulting paint has a 50% polymer solids content, a pigment to binder ratio of 1/1 and a binder composition of nitrocellulose/Polymer A/urea-formaldehyde of 40/30/30.

Nitrocellulose paint Composition IV.—The above constituents of Composition III are used as above to prepare paint Composition IV except nitrocellulose is used in place of Polymer A in the mill base and in the paint composition.

Both paint Compositions III and IV are reduced to a spray viscosity of 27 sec./No. 2 Zahn cup with methyl ethyl ketone and each is sprayed on a separate primed steel panel and baked for 30 minutes at 105° C. The resulting coatings are about 1 mil thick and appear to be well bonded to the respective steel substrates.

Each of the steel substrates coated with Paints I-IV has excellent stain and grease resistance but Compositions I and III formulated with Polymer A have improved hardness and scratch resistance as shown by the following pencil hardness test and Tukon hardness test over the paint Compositions II and IV which did not contain Polymer A. These hardness tests were performed as in Example 1 with the following results:

| | Pencil hardness | Tukon hardness (ASTM D-1475) |
|---|---|---|
| Alkyd Composition I (Polymer A) | HB-H | 10 Knoops. |
| Alkyd Composition II | F-HB | 5 Knoops. |
| Nitrocellulose Composition III (Polymer A) | 2H | 15 Knoops. |
| Nitrocellulose Composition IV | F | 7 Knoops. |

Example 3

The following ingredients are reacted to form a composition of monomeric ester units (Composition 2 Ester):

| | Parts by weight |
|---|---|
| Fumaric acid | 116 |
| Trimethylol ethane | 240 |
| Lauric acid | 402 |
| Xylol | 13 |
| Total | 771 |

The above ingredients are charged into a reaction vessel and the mixture is heated to the reflux temperature of the mixture, water is removed as the mixture is reacted and the reaction is continued until an acid number of 1 or below is reached.

Polymer B having an acrylic backbone is then formed by reacting the above prepared Composition 2 Ester as follows:

| | Parts by weight |
|---|---|
| Portion 1—Xylol | 98 |
| Portion 2: | |
| Methyl methacrylate | 20 |
| 2-ethylhexyl acrylate | 40 |
| Composition 2 Ester | 38 |
| Methacrylic acid | 2 |
| Cumene hydroperoxide | 2 |
| Total | 200 |

Portion 1 is charged into a reactor and is heated to the reflux temperature. Portion 2 is premixed and slowly added to the reactor over a 1-hour period while the mixture is maintained at the reflux temperature. After Portion 2 has been added, the ingredients are maintained at the reflux temperature until a constant viscosity is reached. The resulting Polymer B solution has a 50% by weight polymer solids content and a Gardner Holt viscosity at room temperature of P-S. Polymer B has the following composition:

| | Parts by weight |
|---|---|
| Methyl methacrylate units | 20 |
| 2-ethylhexyl acrylate units | 40 |
| Methacrylic acid units | 2 |
| Composition 2 Ester units | 38 |
| Total | 100 |

A paint is formulated by forming a mill base and blending this mill base with the above prepared Polymer B solution and a urea-formaldehyde resin.

Mill Base B:

| | Parts by weight |
|---|---|
| Titanium dioxide (rutile) | 70 |
| Polymer B solution (50% by weight polymer solids) | 20 |
| Xylol | 10 |
| Total | 100 |

The above ingredients are mixed together and ground to 0.5 mil fineness using the conventional sand-grinding process.

A paint is then prepared by blending the following ingredients:

| | Parts by weight |
|---|---|
| Mill Base B | 143.0 |
| Polymer B solution (50% by weight polymer solids) | 111.4 |
| Urea-formaldehyde resin (55% by weight resin solids in butanol) | 50.0 |
| Diacetone alcohol | 90.0 |
| Pine oil | 5.6 |
| Total | 400.0 |

The paint has a pigment to binder ratio of 1/1, a 50% by weight solids content and the binder has a weight ratio of Polymer B to urea-formaldehyde of 70/30.

This paint is coated on unprimed aluminum stock with a No. 40 wound wire rod to form a coating of about 1.0 mil thick. The coated sheet is baked for 90 seconds at 245° C. and forms a coating which is well bonded to the metal substrate. The dried coating has a high gloss and has good grease and stain resistance and has a pencil hardness of 2H.

Example 4

The following ingredients are reacted to form a composition of monomeric esters (Composition 3 Ester):

| | Parts by weight |
|---|---|
| Itaconic acid | 130 |
| Trimethylol propane | 135 |
| Benzoic acid | 122 |
| Xylol | 8 |
| Total | 395 |

The above ingredients are charged into a reaction vessel and the mixture is heated to the reflux temperature of this mixture; water is removed as the mixture is reacted and the reaction is continued until an acid number 3 or below is reached.

Polymer C having an acrylonitrile/acrylic backbone is formed by reacting the above prepared Composition 3 Ester as follows:

| | Parts by weight |
|---|---|
| Portion 1: | |
| Xylol | 80 |
| Butanol | 17 |
| Portion 2: | |
| Methyl methacrylate | 40 |
| Acrylonitrile | 10 |
| Composition 3 Ester | 49 |
| Acrylic acid | 1 |
| t-Butyl peracetate | 3 |
| Total | 200 |

Portion 1 is charged into a reactor and is heated to the reflux temperature. Portion 2 is premixed and slowly added to the reactor over a 3-hour period while the mixture is maintained at the reflux temperature. After Portion 2 has been added, the ingredients are maintained at the reflux temperature until a constant viscosity is reached. The resulting Polymer C solution has a 50% by weight polymer solids content and a Gardner Holt viscosity at room temperature of Y to Z. Polymer C has the following composition:

| | Parts by weight |
|---|---|
| Methyl methacrylate units | 40 |
| Acrylonitrile units | 20 |
| Acrylic acid units | 1 |
| Composition 3 Ester units | 39 |
| Total | 100 |

A paint is then prepared by forming a mill base and blending this mill base with the above prepared Polymer C solution and benzoguanamine-formaldehyde resin.

| Mill Base C: | Parts by weight |
|---|---|
| Titanium dioxide (rutile) | 50 |
| Polymer C solution (50% polymer solids) | 20 |
| Xylol | 30 |
| Total | 100 |

The above ingredients are mixed and ground to 0.5 mil fineness using the conventional sand-grinding process.

A paint is then prepared by blending the following ingredients:

| | Parts by weight |
|---|---|
| Mill Base C | 100 |
| Polymer C solution | 100 |
| Benzoguanamine-formaldehyde resin solution (66% resin solids in butanol) | 61 |
| Xylol | 139 |
| Total | 400 |

The paint has a pigment to binder ratio of 1/1, a 50% by weight solids content and the binder has a weight ratio of Polymer B to benzoguanamine-formaldehyde of 60/40.

An unprimed steel substrate is dip coated with the above paint composition and baked at 205° C. for 30 minutes to form a uniform coating about 0.5 mil thick. The coating has excellent adhesion to the steel substrate and had a pencil hardness of 4H and is abrasion, stain and grease resistant.

I claim:
1. A coating composition containing 10–90% by weight polymer solids and a solvent for the polymer, said polymer consisting essentially of (A) 50–95% by weight polymerized ethylenically unsaturated monomers having 2–16 carbon atoms per monomer unit and (B) about 5–50% by weight of the polymer of polymerized ethylenically unsaturated esterified monomers selected from the group consisting of

I 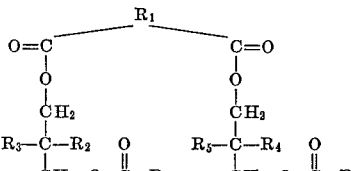

II 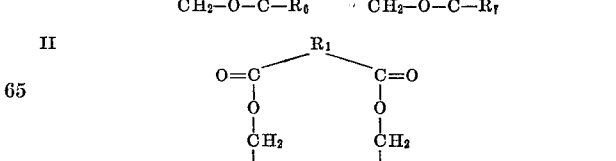

and mixtures thereof; said (A) monomers being different from said (B) monomers, wherein $R_1$ is a hydrocarbon group having 2–6 carbon atoms and at least one site of ethylenic unsaturation; $R_2$ and $R_4$ are each selected from the group of —OH and —$CH_2OH$; $R_3$ and $R_5$ are each selected from the group of —H, —CH$_3$, and —C$_2$H$_5$; R$_6$ and R$_7$ are each selected from the group consisting of saturated aliphatic hydrocarbon radicals of 3–17 carbon atoms and an aromatic radical, R$_8$ and R$_9$ are each selected from the group consisting of

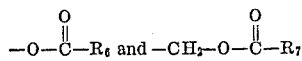

2. The coating composition of claim 1 in which said (B) esterified monomers comprise about 20–40% by weight of the polymer.

3. The coating composition of claim 1 in which R$_1$ is —CH=CH—, R$_6$ and R$_7$ are saturated hydrocarbon radicals of 6–10 carbon atoms.

4. The coating composition of claim 1 in which R$_1$ is

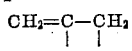

and R$_6$ and R$_7$ are phenyl radicals.

5. The coating composition of claim 1 in which said (A) monomers consist essentially of monomers of an α,β-unsaturated monovinylidene monocarboxylic acid, a methacrylic acid ester of a C$_1$–C$_4$ saturated aliphatic monohydric alcohol, and an aromatic hydrocarbon having 1 or 2 vinylidene groups per molecule.

6. The coating composition of claim 5 in which the monomers consist essentially of monomers of methyl methacrylate, styrene and an α,β-unsaturated monovinylidene carboxylic acid.

7. The coating composition of claim 1 in which said (A) monomers consist essentially of monomers of an α,β-unsaturated monovinylidene carboxylic acid, a methacrylic acid ester and an acrylic acid ester, said esters of a C$_1$–C$_8$ saturated aliphatic monohydric alcohol.

8. The coating composition of claim 7 in which the monomers consist essentially of monomers of methyl methacrylate, 2-ethylhexyl acrylate and methacrylic acid.

9. The coating composition of claim 1 in which said (A) monomers consist essentially of monomers of an α,β-unsaturated monovinylidene monocarboxylic acid, a methacrylic acid ester of a C$_1$–C$_4$ saturated aliphatic monohydric alcohol and acrylonitrile.

10. The coating composition of claim 9 in which the monomers consist essentially of monomers of methyl methacrylate, acrylonitrile and acrylic acid.

11. The coating composition of claim 1 containing from 10–50% by volume pigment.

12. The coating composition of claim 11 containing from 10–60% by weight of a thermosetting nitrogen containing resin.

13. The coating composition of claim 11 containing from 5–50% by weight of a phenol-formaldehyde resin.

14. The coating composition of claim 11 containing from 5–50% by weight of a melamine-formaldehyde resin.

15. The coating composition of claim 11 containing from 5–50% by weight of urea-formaldehyde resin.

16. The coating composition of claim 11 containing from 5–50% by weight of a benzoguanamine-formaldehyde resin.

17. A coating composition having 10–90% by weight polymer solids content and a solvent for the polymer, said polymer comprising 10–40% by weight of at least one of said polymers of claim 1, 20–55% by weight of an alkyd resin, 5–50% by weight of a thermosetting nitrogen containing resin.

18. A coating composition having 10–90% by weight polymer solids content and a solvent for the polymer, said polymer comprising 10–40% by weight of at least one of said polymers of claim 1, 20–55% by weight of nitrocellulose resin, 5–50% by weight of a urea-formaldehyde resin.

19. A coating composition having a 10–90% by weight polymer solids content and a solvent for the polymer, said polymer comprising 10–40% by weight of at least one of said polymers of claim 1, 20–55% by weight of a polymer consisting of units of styrene, units of an acrylic acid ester of a C$_1$–C$_4$ saturated monohydric alcohol and 5–50% by weight of a melamine-formaldehyde resin.

References Cited

UNITED STATES PATENTS 3,002,959 10/1961 Hicks.
3,398,110 8/1968 Klein et al.
3,414,635 12/1968 Edwards et al.
2,720,500 10/1955 Cody.

JOSEPH L. SCHOFER, Primary Examiner
JOHN KIGHT, Assistant Examiner

U.S. Cl. X.R.

117—132; 260—22, 37, 38, 42, 45.3, 75, 842, 861